United States Patent [19]
Nakamura

[11] Patent Number: 5,162,451
[45] Date of Patent: Nov. 10, 1992

[54] CURABLE COMPOSITION

[75] Inventor: Takashi Nakamura, Chiba, Japan

[73] Assignee: Dow Corning Toray Silicone Co., LTD, Tokyo, Japan

[21] Appl. No.: 653,212

[22] Filed: Feb. 11, 1991

[30] Foreign Application Priority Data

Feb. 27, 1990 [JP] Japan .................................. 2-46585

[51] Int. Cl.$^5$ ............................................ C08L 61/02
[52] U.S. Cl. .................................... 525/400; 525/409; 525/411; 525/474; 525/476; 528/12; 528/21; 528/23; 528/29; 528/41
[58] Field of Search ..................... 528/29, 41, 21, 23, 528/12; 525/400, 409, 411, 474, 476

[56] References Cited

U.S. PATENT DOCUMENTS

| 3,143,524 | 8/1964 | Cooper et al. | 528/41 |
| 4,144,206 | 3/1979 | Symeon | 528/24 |
| 4,427,815 | 1/1984 | Ona et al. | 524/315 |
| 4,985,511 | 1/1991 | Wagener et al. | 525/474 |

Primary Examiner—Melvyn I. Marquis
Attorney, Agent, or Firm—George A. Grindahl; Robert L. McKellar

[57] ABSTRACT

A homogeneous composition having improved curability contains an organopolysiloxane having at least two carboxyl group-containing hydrocarbon groups in each molecule, a polymeric compound which contains at least 2 hydroxyl groups and at least one oxyalkylene unit and a catalytic quantity of an esterification reaction catalyst. The curable composition has good standing compatiblity and experiences a high degree of curing. When cured the composition is useful, for example, as an antistatic additive.

15 Claims, No Drawings

CURABLE COMPOSITION

BACKGROUND OF THE INVENTION

The present invention relates to a novel curable composition which, for example, may be used as an antistatic additive.

It is known that resins which contain a polyether component have an antistatic or anticharging function and their blends or composites with a variety of resins have been investigated. However, because the polyether chain strongly absorbs water and because there are also limitations on the types of compatible resins. special technologies are required for the formation of these composites or compounds.

Resin compositions which satisfy such prerequisites have already been disclosed. for example. in Japanese Patent Publication Numbers 61-55538 (55.538/86) and 63-2298 (2.298/88). These take the form of compositions which consist of an unsaturated hydrocarbon group-containing polyether polymer, an SiH-containing polyorganosiloxane, and platinum or a platinum compound as catalyst. Unfortunately, these compositions suffer from a poor compatibility between the polyether component and polyorganosiloxane component, and special measures are required, such as vigorous stirring, etc., in order to homogenize these two components. Nevertheless, even vigorous or forced stirring cannot bring about mixing to the degree of homogeneity required for a high degree of completion of the curing reaction.

The use of organic solvent could be contemplated as another technique for the thorough mixing or compatibilization of these components. However. aside from the fact that this approach cannot be applied to some products, the use of organic solvent is associated with the following problems: the manufacturing operation is made more complex; the manufacturing environment is degraded; the final product may contain solvent residues; surrounding materials can be damaged; and so forth.

Another problem with these compositions is the discoloration arising due to the platinum metal remaining after curing.

Thus, the heretofore proposed curable compositions containing polysiloxane component and polyether component in each case suffer from problems with their properties or production methods.

The present inventors achieved the invention under consideration as the result of extensive research directed toward a solution to one or more the noted problems.

BRIEF SUMMARY OF THE INVENTION

The present invention takes as its object the introduction of a novel curable composition which has an excellent standing or storage stability (no phase separation) as well as a high degree of curing reaction completion, and a cured composition useful, for example, as an antistatic additive, etc.

The present invention relates to a curable composition which comprises (A) an organopolysiloxane having at least two carboxyl group-containing hydrocarbon groups in each molecule;

(B) a polymeric compound, each molecule of which contains at least 2 hydroxyl groups and at least one oxyalkylene unit, in a quantity such that the ratio between the number of mols of hydroxyl groups in the instant component and the number of mols of carboxyl groups in component (A) has a value of (1:10) to (10:1); and (C) a catalytic quantity of an esterification reaction catalyst.

The present invention further relates to a composition obtained from curing the composition of this invention and to its use as an additive for synthetic rubbers and resins.

DETAILED DESCRIPTION OF THE INVENTION

To explain the preceding in greater detail. each molecule of the organopolysiloxane comprising component (A) must contain at least 2 carboxyl group-containing hydrocarbon groups. In addition, values within the range of 0.01 to 100 are preferred for the ratio between siloxane units in which a carboxyl group-containing hydrocarbon group is bonded and the other siloxane units.

The molecular structure of this component may have any siloxane structure such as a linear structure, branched structure, cyclic structure, network structure or threedimensional structure; however, in order to facilitate formation of the cured material, it is preferred that at least half of it be straight chain or branched. While its molecular weight is not specifically restricted. values within the range of 100 to 100,000 are preferred in order to facilitate production and obtain a suitable hardness in the cured product. The carboxyl group-containing hydrocarbon group is exemplified by groups with the formula HOOCR$^8$— wherein R$^8$ comprises alkylene groups having 1 to 18 carbons such as methylene, ethylene, propylene, butylene, pentylene, hexylene, heptylene, octylene, etc. and arylene groups having 6 to 20 carbons such as phenylene, naphthylene, etc.

Carboxyalkyl groups are preferred among the preceding, and the carboxypropyl group is particularly preferred.

The silicon-bonded organic groups in component (A) other than the carboxyl-containing hydrocarbon groups are monovalent hydrocarbon groups having 1 to 20 carbons as exemplified by alkyl groups such as methyl, ethyl, propyl, and so forth; aryl groups such as phenyl, tolyl, xylyl, and so forth; and aralkyl groups such as benzyl, phenethyl, and so forth.

Component (A) may contain other silicon-bonded functional groups in the form of small quantities of the hydrogen atom and alkoxy group. It will be preferable for methyl to comprise at least half of the silicon-bonded organic groups from the standpoints of the economics and formation of a good cured product. This organopolysiloxane is exemplified as follows: trimethylsiloxy-terminated methylcarboxypropylsiloxanedimethylsiloxane copolymers, and trimethylsiloxy-terminated methylcarboxypropylsiloxanemethylphenylsiloxane copolymers.

Various suitable methods are known for the synthesis of the organopolysiloxane under consideration. In one such method, cyano group-containing organodichlorosilane and cyano group-free organodichlorosilane are cohydrolyzed, and the obtained cyclics and an end-blocking agent are stirred in aqueous sulfuric acid solution in order to run a ring-opening polymerization along with conversion of the cyano group to the carboxyl group.

The polymeric compound comprising component (B) must contain at least 2 hydroxyl groups and at least 1 oxyalkylene unit in each molecule.

The mutual compatibility of components (A) and (B) is absolutely crucial since this leads to the degree of homogeneity required for a high degree of completion of the curing reaction and the elimination of the problems discussed hereinbefore. While no particular restriction is placed on the molecular structure and chemical structure of component (B) in order to bring about its compatibility with component (A), the presence of the siloxane unit in the molecule is preferred. From the standpoint of, inter alia, ease of formation of the cured material, organopolysiloxane is preferred which contains at least two hydroxyl-terminated polyoxyalkylene graft chains and has the following general formula:

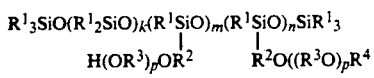

wherein $R^1$ is a monovalent hydrocarbon group, $R^2$ and $R^3$ are alkylene groups, $R^4$ is a monovalent hydrocarbon group, k and n are integers with values of zero to 1,000, m is an integer with a value of 2 to 1,000, and p is an integer with a value of 1 to 100.

The group $R^1$ in the preceding organopolysiloxane formula comprises a monovalent hydrocarbon group as exemplified by alkyl groups such as methyl, ethyl, propyl, etc.; aryl groups such as phenyl, tolyl, and xylyl, etc.; and aralkyl groups such as benzyl, phenethyl, etc. From the standpoint of a favorable curability, it will be advantageous for methyl to comprise at least half of the groups $R^1$. The group $R^2$ comprises alkylene groups such as methylene, ethylene, propylene, butylene, pentylene, hexylene, heptylene, octylene, and so forth. The group $R^3$ also comprises alkylene groups such as methylene, ethylene, propylene, butylene, pentylene, hexylene, heptylene, and so forth. The group $R^4$ comprises monovalent hydrocarbon groups as exemplified by alkyl groups such as methyl, ethyl, propyl, etc. and by acyl groups such as acetyl, propionyl, etc.

The subscripts k and n are to fall within the range of zero to 1,000, while the value of m is to fall within the range of 2 to 1,000. Although no specific restriction is applied to any of these, the ratio between k and (m+n) preferably falls within the range of (1:5) to (5:1) in order to induce compatibility between components (A) and (B).

Various suitable methods are known for the synthesis of such organopolysiloxanes. In one such method organopolysiloxane having hydrogen as a portion of the side groups is grafted via the hydrosilylation reaction with polyoxyalkylene having the acyloxy group at one terminal and an unsaturated hydrocarbon group at the other terminal and with polyoxyalkylene having the trimethylsilyl group at one terminal and an unsaturated hydrocarbon group at the other terminal, with these polyoxyalkylenes being present in a specified ratio. This is followed by conversion of only the trimethylsilyl group at the graft terminals into the hydroxyl group using, for example, excess alcohol.

As described above, component (B) comprises a polymeric compound whose molecule contains at least 2 hydroxyl groups and at least 1 oxyalkylene unit. However, when it is desired to raise the content of polyoxyalkylene in the cured material, it will be advantageous for component (B) to consist of the aforesaid polymeric compound combined with the following: polyoxyalkylene having the hydroxyl group at both molecular chain terminals as represented by the formula $HO(R^5O)_qH$ wherein $R^5$ is an alkylene group and q is an integer with a value of 1 to 100; and/or polyoxyalkylene having the hydroxyl group at one molecular chain terminal as represented by the formula $HO(R^6O)_rR^7$ wherein $R^6$ is an alkylene group. $R^7$ is a monovalent hydrocarbon group, and r is an integer with a value of 1 to 100.

The groups $R^5$ and $R^6$ in the preceding polyoxyalkylene formulas comprise alkylene groups such as methylene, ethylene, propylene, butylene, pentylene, hexylene, heptylene and so forth. The group $R^7$ comprises monovalent hydrocarbon groups as exemplified by alkyl groups such as methyl, ethyl, propyl, etc. and by acyl groups such as acetyl, propionyl, and so forth.

The values of q and r should fall within the range of 1 to 100 and preferably within the range of 5 to 20.

On the subject of the blending proportion of component (B), the ratio between the number of mols of hydroxyl groups in this component and the number of mols of carboxyl groups in component (A) should fall within the range of (1:10) to (10:1) and preferably falls within the range of (1.0:1.2) to (1.2:1.0). While the esterification reaction between components (A) and (B) will proceed at any such ratio to afford a solidified cured product, large differences between the number of mols of carboxyl groups in component (A) and the number of mols of hydroxyl groups in component (B) lead to a condition in which unreacted carboxyl groups or hydroxyl groups remain. The cured resin thus obtained will readily take up moisture and/or evidence a high degree of chemical reactivity, both of which are undesirable.

The esterification reaction catalyst comprising component (C) functions to induce bonding via the esterification reaction between the carboxyl groups in component (A) and the hydroxyl groups in component (B). Useful catalysts in this regard are Lewis acids such as hydrochloric acid, sulfuric acid, etc. and basic compounds such as the alkali metal hydroxides.

The curable composition of the present invention is obtained in a straightforward manner merely by mixing the aforementioned components (A) through (C) to homogeneity.

The curable composition of the present invention can be cured by long-term standing at room temperature or by heating. In this case, the curing reaction (esterification reaction) can be accelerated by rapidly removing the water produced by the esterification reaction from the system. Curing in this case is advantageously executed by removing the water produced by the esterification reaction by heating in vacuo. The curing temperature here will generally not exceed 150 degrees Centigrade.

In addition, the aforesaid mixture of components (A) to (C) is preferably held in vacuo as a final step. For example, a recommended method consists of first developing the esterification reaction to a certain degree by heating at ambient pressure and subsequently heating in vacuo in order simultaneously to remove the produced water and complete the esterification reaction. However, in the case of the use of solvent in a solvent-based process, after the esterification reaction has been developed to a certain degree at ambient pressure at a temperature at or below the solvents boiling point, the solvent must first be evaporated off prior to heating in vacuo.

The curable composition of the present invention as described above is qualified for use as an antistatic additive, for example, for synthetic rubbers such as silicone rubber, etc. organic resins, and so forth.

The present invention is explained in greater detail through the following illustrative examples.

EXAMPLE 1

1.81 Grams compound (1) with the following formula $Me_3SiO(MeXSiO)_{35}(Me_2SiO)_{65}SiMe_3$ wherein X is $-CH_2CH_2COOH$ and Me is methyl; 8.19 g compound (2) with the following formula $Me_3SiO(MeYSiO)_2$-$(MeZSiO)(Me_2SiO)_7SiMe_3$ wherein Y is $-CH_2CH_2C$-$H_2O(CH_2CH_2O)_{12}H$, Z is $-CH_2CH_2CH_2O(CH_2C$-$H_2O)_{12}COCH_2$ and Me is methyl: and 30 microliters 0.1 normal ethanolic hydrochloric acid solution were thoroughly mixed by stirring to afford a homogeneous and transparent liquid mixture. This liquid mixture was poured into a teflon dish, heated for 2 hours at 120 degrees Centigrade on a hot plate, and then dried in vacuo for 4 days at 140 degrees Centigrade in a vacuum desiccator. The product was a transparent sheet with a thickness of 1 cm. Structural analysis was carried out on this sheet using infrared spectroscopic analysis. Its absorption spectrum did not contain peaks associated with the hydroxyl group while a peak associated with the carbonyl group was located at 1740 cm$^{-1}$. These results supported the conclusion that the esterification reaction had proceeded essentially to completion. In addition, this sheet's hardness was measured using the hardness meter stipulated in JIS K 6301: a hardness of 20 (JIS A) was found.

In another experiment. a liquid mixture of 1.81 g compound (1), 8.19 g compound (2), and 30 microliters 0.1 normal ethanolic hydrochloric acid solution was maintained at room temperature for approximately 3 months after mixing. The appearance of the liquid mixture after standing was investigated with the following result, there was no phase separation of compounds (1) and (2). This liquid mixture was then poured into a teflon dish and cured as above to afford a transparent sheet with a thickness of 1 cm. The same measurement values as above were obtained when the infrared absorption spectrum and hardness of this sheet were measured as above. Lithium foil was then placed against this transparent sheet. and this was held for 1 month in an argon atmosphere. The contact surface of the lithium foil evidenced an almost complete retention of activity.

Transparent sheet obtained as above was converted into a powder (powder A) by grinding in an agate mortar.

A silicone rubber composition was then prepared from 100 weight parts dimethylvinylsiloxy-terminated dimethylsiloxanemethylvinylsiloxane copolymer gum. silanol-terminated dimethylpolysiloxane (viscosity=20 centistokes), 45 weight parts wet-method silica with a specific surface area of 200 m²/g, and 0.5 weight parts 2,5-dimethyl-2,5-di(tert butylperoxy)hexane.

Five grams powder A prepared as above was mixed into 100 weight parts of this silicone rubber composition using a two-roll mill. The obtained mixture was compression molded (10 minutes/170 degrees Centigrade) using a compression press to give a rubber sheet with a thickness of 1 mm. The volume resistivity of this rubber sheet was measured at $1.2 \times 10^{-12}$ ohm-cm.

For comparison, a 1 mm-thick rubber sheet was prepared as above without the use of powder A. The volume resistivity of this rubber sheet was measured at $1.2 \times 10^{-14}$ ohm-cm.

Thus, when cured material obtained from a curable composition according to the present invention was blended into a silicone rubber composition, the volume resistivity of the silicone rubber composition was substantially reduced.

EXAMPLE 2

3.79 Grams compound (1) as described in Example 1, 3.82 g compound (2) as described in Example 1, 2.39 g compound (3) with the following formula $HO(CH_2$-$H_2O)_{12}H$, and 30 microliters 0.1 normal ethanolic hydrochloric acid solution were thoroughly mixed by stirring to afford a homogeneous and transparent liquid mixture. This liquid mixture was poured into a teflon dish followed by heating for 2 hours at 120 degrees Centigrade on a hot plate and vacuum drying for 4 days at 140 degrees Centigrade in a vacuum desiccator. The product was a transparent sheet with a thickness of 1 cm.

The infrared absorption spectrum of this sheet confirmed that the esterification reaction had proceeded essentially to completion. The hardness of this film was measured as in Example 1 at 19 (JIS A).

This sheet was then converted into a powder (powder B) by grinding in an agate mortar.

Five grams powder B was mixed using a two-roll mill into 100 weight parts silicone rubber composition prepared as in Example 1. The resulting blend was compression molded (10 minutes/170 degrees Centigrade) using a compression press to afford a rubber sheet with a thickness of 1 mm. The volume resistivity of this rubber sheet was measured at $1.0 \times 10^{-12}$ ohm-cm.

The liquid mixture of 3.79 g compound (1), 3.82 g compound (2), 2.39 g compound (3), and 30 microliters 0.1 normal ethanolic hydrochloric acid solution was maintained at room temperature for approximately 3 months after mixing. When the appearance of this liquid mixture was examined after standing, it was observed that no phase separation had occurred among compounds (1), (2), and (3). This liquid mixture was then poured into a teflon dish and cured as above to afford a transparent sheet with a thickness of 1 cm. The same measurement values as above were obtained when the infrared absorption spectrum and hardness of this sheet were measured as above.

EXAMPLE 3

The following were thoroughly mixed by stirring to afford a homogeneous and transparent liquid mixture: 3.51 g compound (1) as described in Example 1, 3.98 g compound (2) as described in Example 1, 1.66 g compound (3) as described in Example 2, 0.85 g compound (4) with the following formula $HO(CH_2CH_2O)_{12}CH_3$, and 30 microliters 0.1 normal ethanolic hydrochloric acid solution. This liquid mixture was poured into a teflon dish, then heated for 2 hours at 120 degrees Centigrade on a hot plate and finally vacuum dried for 4 days at 140 degrees Centigrade in a vacuum desiccator to afford a transparent sheet with a thickness of 1 cm.

It was confirmed from the infrared absorption spectrum of this sheet that the esterification reaction had proceeded essentially to completion. The hardness of this film was also measured as in Example 1 to give a value of 19 (JIS A).

In addition, a liquid mixture consisting of 3.51 g compound (1), 3.98 g compound (2), 1.66 g compound (3), 0.85 g compound (4), and 30 microliters 0.1 normal ethanolic hydrochloric acid was maintained at room temperature for approximately 3 months after mixing. The appearance of the liquid mixture was inspected after this period of standing, and it was found that no phase separation had occurred among compounds (1), (2), (3), and (4). This liquid mixture was then poured into a teflon dish and cured as above to afford a transparent sheet with a thickness of 1 cm. The infrared absorption spectrum and hardness of this sheet were measured as above, and the same measurement values as above were obtained.

Transparent sheet obtained as above was converted into a powder (powder C) by grinding in an agate mortar. Five grams of this powder C was mixed into 100 weight parts silicone rubber composition as above using a two-roll mill. The obtained mixture was compression molded (10 minutes/170 degrees Centigrade) using a compression press to afford a rubber sheet with a thickness of 1 mm. The volume resistivity of this rubber sheet was measured at $9.6 \times 10^{-12}$ ohm-cm.

EFFECTS OF THE INVENTION

The curable composition of the present invention is a novel curable composition, and. because it consists of components (A) through (C), it is characterized by an excellent storage or standing stability (no phase separation), an excellent degree of curing reaction completion. and a strong performance as an antistatic additive.

That which is claimed is:
1. A curable composition comprising
   (A) an organopolysiloxane having at least two carboxyl group-containing hydrocarbon groups in each molecule,
   (B) a polymeric compound, each molecule of which contains at least 2 hydroxyl groups and at least one oxyalkylene unit, in a quantity such that the ratio between the number of mols of hydroxyl groups in the instant component and the number of mols of carboxyl groups in component (A) has a value of (1:10) to (10:1), and
   (C) a catalytic quantity of an esterification reaction catalyst.
2. A curable composition according to claim 1 wherein component (B) is an organopolysiloxane as represented by the formula

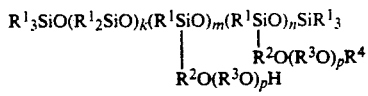

wherein $R^1$ is a monovalent hydrocarbon group. $R^2$ and $R^3$ are alkylene groups, $R^4$ is a monovalent hydrocarbon group, k and n are integers with values of zero to 1,000, m is an integer with a value of 2 to 1,000, and p is an integer with a value of 1 to 100.

3. A curable composition according to claim 2 wherein component (A) is a polydiorganosiloxane wherein the ratio between siloxane units in which a carboxyl group-containing hydrocarbon group is bonded and the other siloxane units falls within the range of 0.01 to 100; its molecular weight falls within the range of 100 to 100,000; the carboxyl groupcontaining hydrocarbon on group has the formula HOOCR$^8$- wherein $R^8$ is selected from the group consisting of alkylene groups having 1 to 18 carbons and arylene groups having 6 to 20 carbons; the silicon-bonded organic groups in component (A) other than the carboxyl-containing hydrocarbon groups are monovalent hydrocarbon groups having 1 to 20 carbons and methyl comprises at least half of the silicon-bonded organic groups.

4. A curable composition according to claim 3 wherein component (A) is a methylcarboxypropylsiloxane-dimethylsiloxane copolymer.

5. A composition comprising the esterification product obtained from the reaction of a curable mixture comprising
   (A) organopolysiloxane having at least two carboxyl group-containing hydrocarbon groups in each molecule,
   (B) polymeric compound, each molecule of which contains at least 2 hydroxyl groups and at least one oxyalkylene unit, in a quantity such that the ratio between the number of mols of hydroxyl groups in the instant component and the number of mols of carboxyl groups in component (A) has a value of (1:10) to (10:1), and
   (C) a catalytic quantity of an esterification reaction catalyst.
6. A composition according to claim 5 wherein the polymeric compound comprising component (B) is an organopolysiloxane as represented by the formula

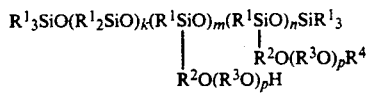

wherein $R^1$ is a monovalent hydrocarbon group, $R^2$ and $R^3$ are alkylene groups, $R^4$ is a monovalent hydrocarbon group, k and n are integers with values of zero to 1,000, m is an integer with a value of 2 to 1,000, and p is an integer with a value of 1 to 100.

7. A composition according to claim 6 wherein the component (A) is a polydiorganosiloxane wherein the ratio between siloxane units in which a carboxyl group-containing hydrocarbon group is bonded and the other siloxane units falls within the range of 0.01 to 100; its molecular weight falls within the range of 100 to 100,000; the carboxyl groupcontaining hydrocarbon group has the formula HOOCR$^8$ wherein $R^8$ comprises alkylene groups having 1 to 18 carbons and arylene groups having 6 to 20 carbons; the silicon-bonded organic groups in component (A) other than the carboxylcontaining hydrocarbon groups are monovalent hydrocarbon groups having 1 to 20 carbons and methyl comprises at least half of the silicon-bonded organic groups.

8. A composition according to claim 7 wherein component (A) is a methylcarboxypropylsiloxane-dimethylsiloxane copolymer.

9. A method for substantially reducing the volume resistivity of a silicone rubber composition, said method comprising blending into said silicone rubber composition an effective amount of the composition of claim 5.

10. A method for substantially reducing the volume resistivity of a silicone rubber composition said method comprising blending into said silicone rubber composition an effective amount of the composition of claim 6.

11. A method for substantially reducing the volume resistivity of a silicone rubber composition said method comprising blending into said silicone rubber composition an effective amount of the composition of claim 7.

12. A composition according to claim 5 wherein (B) further comprises a polyoxyalkylene component selected from the group consisting essentially of (i) polyoxyalkylene having the general formula $HO(R^5O)_qH$ wherein $R^5$ is an alkylene group and q is an integer with a value of 1 to 100; and (ii) polyoxyalkylene having the general formula $HO(R^6O)_rR^7$ wherein $R^6$ is an alkylene group, $R^7$ is a monovalent hydrocarbon group, and r is an integer with a value of 1 to 100.

13. A method for substantially reducing the volume resistivity of a silicone rubber composition, said method comprising blending into said silicone rubber composition an effective amount of the composition of claim 12.

14. A method for substantially reducing the volume resistivity of a silicone rubber composition, said method comprising blending into said silicone rubber composition an effective amount of the composition of claim 8.

15. A curable composition according to claim 3 wherein (B) further comprises a polyoxyalkylene component selected from the group consisting essentially of (i) polyoxyalkylene having the general formula $HO(R^5O)_qH$ wherein $R^5$ is an alkylene group and q is an integer with a value of 1 to 100; and (ii) polyoxyalkylene having the general formula $HO(R^6O)_rR^7$ wherein $R^6$ is an alkylene group, $R^7$ is a monovalent hydrocarbon group, and r is an integer with a value of 1 to 100.

* * * * *